Patented Jan. 2, 1945

2,366,497

UNITED STATES PATENT OFFICE 2,366,497

DEALKYLATION OF ALKYLATED PHENOLS

Oliver H. Dawson, Baytown, Tex., assignor to Standard Oil Development Company, a corporation of Delaware No Drawing. Application February 8, 1943, Serial No. 475,163

6 Claims. (Cl. 260—682)

The present invention is directed to an improved method for dealkylating alkylated phenolic materials.

It is well known to the art that tertiary olefins can be reacted with phenolic compounds in the presence of a suitable catalyst to produce alkylated phenols. As specific examples phenol and cresol are alkylated readily with isobutylene in the presence of a small quantity of sulfuric or sulfonic acids as the catalyst. It is further known to the art that alkylated phenols of the type described may be decomposed by heating them under atmospheric pressures at temperatures ranging from 325° to 500° F., and the tertiary olefins recovered therefrom.

The method of decomposition of the alkyl phenols by heat under atmospheric pressure suffers the disadvantage that substantial amounts of phenols and phenol sulfonic acid catalysts decompose. This undesired decomposition of the phenolic materials and the acid catalyst materials is indicated by the sulphur dioxide released and the formation of polymers from the hydrocarbon material during the decomposition reaction.

It has been proposed to recover tertiary olefins from mixtures with paraffins and normal and secondary olefins by contacting the mixtures with a phenolic compound in the presence of a catalyst at temperatures ranging from 70° F. to 175° F., then separating the alkylated phenol from the admixture by settling and subsequently decomposing the alkylated phenol and recovering the tertiary olefins. While this proposal has seemed attractive on its face, it has not been found satisfactory for commercial operations because the phenolic material with which the tertiary olefins must be reacted to form alkylated phenols are quite expensive, as are the catalysts employed, and the decomposition of these materials during the recovery of the tertiary olefins has prevented the adoption of the proposal for commercial operations.

In accordance with the present invention, alkylated phenolic materials are decomposed readily to allow the recovery of the tertiary olefins without loss of the phenolic materials.

In accordance with the present invention, tertiary olefins are recovered from alkylated phenols by heating the alkylated phenols and simultaneously sweeping, with an inert vaporous or gaseous material, the tertiary olefins out of contact with the remaining alkylated phenols and the phenols resulting from the decomposition. It is preferred to conduct this operation under substantially atmospheric pressures and at a temperature range of 275° to 350° F. Steam has been found particularly suitable as the agent for sweeping the tertiary olefins from the solution, but other materials, for example, carbon dioxide and nitrogen are also satisfactory. An advantage in the employment of steam for the sweeping agent is that the vaporized tertiary olefin and the steam may be liquefied by cooling and the olefin then separated from the condensed water by gravity settling.

A comparison of the results obtained when practicing the present invention with those obtained when practicing the conventional method of recovering the olefins from alkyl phenols is given in the following table. In this table run I was made under atmospheric pressures without the addition of a gas or vapor to the liquid, while run II was made under atmospheric pressures with steam injected into the solution during the heating thereof to assist in sweeping out the isobutylene from the solution.

| Dealkylation of alkyl phenols | Run I | Run II |
|---|---|---|
| T-butyl cresol charged................grams.. | 200 | 200 |
| Temperature of dealkylation............° F.. | 400 | 315 |
| Gas collected..........................liters.. | 6,000 | 6,700 |
| Isobutylene in gas....................per cent.. | 94 | 99.5 |
| Polymer formed............cubic centimeters.. | 5 | 1.5 |
| SO₂ evolved..........................grams.. | 0.0512 | 0.0 |

From the above table it will be seen that almost four times as much polymer was formed when the alkyl phenol was decomposed without the use of a gaseous or vaporous sweeping agent. It will also be evident that substantial amounts of $SO_2$ were evolved in run I, but that none could be detected during run II wherein steam was injected. In addition it will be seen that the use of a vapor to sweep out the isobutylene not only caused a larger amount of hydrocarbons to be removed from the solution, but in addition there was a substantially higher percentage of isobutylene present in the gas removed.

It may be pointed out that the temperature and pressure conditions to which the alkyl phenol is subjected when recovering olefin therefrom, appear to lie within a critical range in order to cause decomposition of the alkyl phenol and yet prevent decomposition of the phenol itself. An attempt was made to dealkylate an alkyl phenol by heating it under a reduced pressure, but this attempt proved unsuccessful. With the alkylated phenol maintained under a pressure of from 3 to 4 inches of mercury absolute, no decomposition could be obtained because the alkylated phenol distilled overhead before decomposition occurred.

From the above examples, it will be seen that the advantages obtained when practicing the present invention do not spring simply from a lowering of the vapor pressure above the alkyl phenol being heated, but instead result from the discovery that pressure and temperature conditions must be maintained within a critical range in order to decompose the alkyl phenol to diolefin and phenol without loss of substantial amounts of the phenol and of the diolefin.

Having fully described the practice of the present invention, what I desire to claim is:

1. A process of recovering tertiary olefins from alkyl phenols comprising the steps of heating an alkyl phenol, under a pressure sufficient to maintain it in the liquid phase, to a temperature sufficiently high to decompose it into an olefin and a phenol and sweeping the olefin resulting from said decomposition out of said liquid phase by means of an inert gasiform agent.

2. A process in accordance with claim 1 in which said gasiform agent is steam.

3. A process in accordance with claim 1 in which said gasiform agent is carbon dioxide.

4. A process in accordance with claim 1 in which said gasiform agent is nitrogen.

5. A process of recovering isobutylene from butyl cresol comprising the steps of heating said butyl cresol under a pressure sufficient to maintain it in a liquid phase to a temperature sufficiently high to decompose said butyl cresol into butylene and cresol, and sweeping the butylene out of said liquid phase by passing steam through said liquid phase.

6. A process in accordance with claim 5 in which the pressure on said liquid phase is substantially atmospheric and the temperature is maintained between 275° and 350° F.

OLIVER H. DAWSON.